(12) United States Patent
Williams et al.

(10) Patent No.: US 6,572,506 B2
(45) Date of Patent: Jun. 3, 2003

(54) TWO-SPEED FULL-TIME TRANSFER CASE WITH INTEGRATED PLANETARY GEARSET AND SYNCHRONIZED RANGE SHIFT

(75) Inventors: Randolph C. Williams, Weedsport, NY (US); Aaron Ronk, Lake George, NY (US); Stanislav Ponca, Liverpool, NY (US); Timothy R. Stalloch, Cicero, NY (US)

(73) Assignee: New Venture Gear, Inc., Troy, MI (US)

( * ) Notice: Subject to any disclaimer, the term of this patent is extended or adjusted under 35 U.S.C. 154(b) by 10 days.

(21) Appl. No.: 09/981,164

(22) Filed: Oct. 17, 2001

(65) Prior Publication Data

US 2003/0073536 A1 Apr. 17, 2003

(51) Int. Cl.⁷ ............................................. F16H 37/08
(52) U.S. Cl. ..................... 475/204; 475/198; 180/247
(58) Field of Search ................ 475/204, 298, 475/198, 199; 180/247, 248; B60K 17/344, 17/346

(56) References Cited

U.S. PATENT DOCUMENTS

| | | | |
|---|---|---|---|
| 4,878,399 A | * 11/1989 | Kameda | 475/269 |
| 5,078,660 A | 1/1992 | Williams et al. | |
| 5,284,068 A | 2/1994 | Frost | |
| 5,346,442 A | 9/1994 | Eastman | |
| 5,411,447 A | 5/1995 | Frost | |
| 5,582,263 A | 12/1996 | Varma et al. | |
| 5,584,776 A | * 12/1996 | Weilant et al. | 475/213 |
| 5,651,749 A | 7/1997 | Wilson et al. | |
| 5,655,986 A | 8/1997 | Wilson et al. | |
| 5,697,861 A | * 12/1997 | Wilson | 475/198 |
| 5,702,321 A | 12/1997 | Bakowski et al. | |
| 5,704,867 A | 1/1998 | Bowen | |
| 5,833,566 A | * 11/1998 | Showalter | 475/198 |
| 5,836,847 A | 11/1998 | Pritchard | |
| 5,885,182 A | * 3/1999 | Forsyth | 475/198 |
| 5,902,205 A | 5/1999 | Williams | |
| 5,947,858 A | 9/1999 | Williams | |
| 5,951,429 A | 9/1999 | Eastman | |
| 5,954,612 A | * 9/1999 | Baxter, Jr. | 475/198 |
| 6,022,289 A | 2/2000 | Francis | |
| 6,056,666 A | 5/2000 | Williams | |
| 6,113,512 A | 9/2000 | Williams | |
| 6,230,577 B1 | * 5/2001 | Showalter et al. | 74/337.5 |
| 6,398,688 B2 | * 6/2002 | Brown et al. | 475/204 |

\* cited by examiner

*Primary Examiner*—Saul Rodriguez
*Assistant Examiner*—David D. Le
(74) *Attorney, Agent, or Firm*—Harness, Dickey & Pierce P.L.C.

(57) ABSTRACT

A full-time transfer case is equipped with an integrated planetary gearset assembly and a synchronized range shift mechanism to provide high-range and low-range drive connections. The integrated planetary gearset assembly includes a first gearset which acts as a two-speed reduction unit and second a gearset which acts as an interaxle differential. The synchronized range shift mechanism is arranged to concurrently move two components of the first gearset and is synchronized to permit on-the-move range shifts.

16 Claims, 7 Drawing Sheets

TWO-SPEED FULL-TIME TRANSFER CASE WITH INTEGRATED PLANETARY GEARSET AND SYNCHRONIZED RANGE SHIFT

FIELD OF THE INVENTION

The present invention relates generally to a power transfer system for controlling the distribution of drive torque between the front and rear drivelines of a four-wheel drive vehicle. More particularly, the present relates to a full-time transfer case having a two-speed gear reduction unit and an interaxle differential integrated into:a planetary gear assembly, a synchronized range shift mechanism for establishing high-range and low-range drive modes, and a biasing clutch for controlling interaxle slip between the-front and rear drivelines.

BACKGROUND OF THE INVENTION

Due to growing consumer demand for four-wheel drive vehicles, a plethora of different power transfer systems are currently utilized for directing power (i.e., drive torque) to all four wheels of the vehicle. For example, in many "part-time" power transfer systems, a transfer case is installed between the front and rear drivelines and is normally operable in a two-wheel drive mode for delivering drive torque to the driven wheels. However, the four-wheel drive mode is desired, a mode shift mechanism is selectively actuated by the vehicle operator for directly coupling the non-driven wheels to the driven wheels for establishing a part-time or locked four-wheel drive mode. One example of a part-time transfer case is disclosed in commonly-owned U.S. Pat. No. 4,770,280.

It is also known to use "on-demand" power transfer systems for automatically directing power to the non-driven wheels, without any input or action on the part of the vehicle operator, when traction is lost at the driven wheels. Typically, the on-demand feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque to the non-driven wheels. The amount of drive torque transferred through the clutch assembly can be varied as a function of specific vehicle dynamics detected by the sensor arrangement. One example of an on-demand power transfer system is disclosed in commonly-owned U.S. Pat. No. 5,323,871.

As yet a further alternative, some vehicles are equipped with a full-time power transfer system having a transfer case equipped with a center differential that functions to permit interaxle speed differentiation while transferring drive torque to both the front and rear drivelines. To minimize loss of traction due to wheel slip, many full-time transfer cases are also equipped with a clutch assembly for limiting speed differentiation and biasing the torque transferred across the center differential. For example, full-time transfer cases are disclosed in commonly-owned U.S. Pat. Nos. 5,697,861 and 5,702,321.

A significant number of the transfer cases discussed above are equipped with a gear reduction unit and a range shift mechanism operable for permitting the vehicle-operator to choose between high-range and low-range drive modes. In many instances, the vehicle must be stopped before the transfer case can be shifted between its high-range and low-range drive modes. Unfortunately, the need to stop the vehicle prior to shifting between the high-grade and low-range drive modes is inconvenient, particularly upon encountering road conditions or surface terrains where continuation of the vehicle's rolling momentum would assist in overcoming the conditions encountered. To alleviate this inconvenience, some two-speed transfer cases are equipped with a synchronized range shift mechanism from permitting "on-the-move" shifting between the high and low ranges.

In an effort to minimize the overall size of full-time two-speed transfer cases, it has been proposed to incorporate the gear reduction unit and the interaxle differential into a common planetary gear assembly. For example, commonly-owned U.S. Pat. No. 5,902,205 discloses a full-time two-speed transfer case equipped with an integrated planetary gearset which is operable for establishing full-time high-range and low-range four-wheel drive modes through on-the-move shifting of a synchronized range shift mechanism. While such an arrangement provides a compact construction, there is a continuing need to develop alternatives which meet modern requirements for low noise and weight while advancing the state of the four-wheel drive art.

SUMMARY OF THE INVENTION

It is therefore an object of the present invention to provide a transfer case for a full-time four-wheel drive vehicle having a planetary gear assembly which integrates a gear reduction unit and an interaxle differential into a common arrangement.

As an additional object of the present invention, the full-time two-speed transfer case includes a synchronized range shift mechanism which can be selectively actuated for establishing a full-time four-wheel high-range drive mode, a neutral mode, and a full-time four-wheel low-range drive mode.

According to another object of the present invention, the transfer case includes a biasing clutch which is operably associated with the outputs of the planetary gear assembly for limiting speed differentiation and regulating the drive torque distribution therebetween in response to the occurrence of slip between the front and rear output shafts of the transfer case. To this end, a control system is provided which includes sensors for detecting and generating sensor signals indicative of various dynamic and operational characteristics of the vehicle, and a controller for controlling actuation, of the biasing clutch in response to the sensor signals. Upon the occurrence of traction loss, the clutch is automatically actuated for limiting interaxle slip while transferring increased drive torque to the non-slipping driveline.

According a preferred embodiment of the present invention, the planetary gear assembly is operably installed between and input shaft and front and rear output shafts of the transfer case and is constructed in a compact arrangement. The planetary gear assembly includes a first planetary gearset and a second planetary gearset which are interconnected by a common carrier assembly. The first planetary gearset is operably installed between the input shaft arid the second planetary gearset for driving the carrier assembly at either of a direct speed ratio (i.e., high-range) or a reduced speed ratio (i.e., low-range) relative to the input shaft. The common carrier assembly acts as the input to the second planetary gearset which has first and second outputs respectively connected to the rear and front output shafts of the transfer case. Thus, the second planetary gearset functions as an interaxle differential for permitting speed differentiation and distributing drive torque between the front and rear output shafts of the transfer case.

Additional objects come with features and advantages of the present invention will become apparent from studying the following detailed description and appended claims when taken in conjunction with accompanying drawings.

DETAILED DESCRIPTION OF THE PREFERRED EMBODIMENTS

Figure 1:
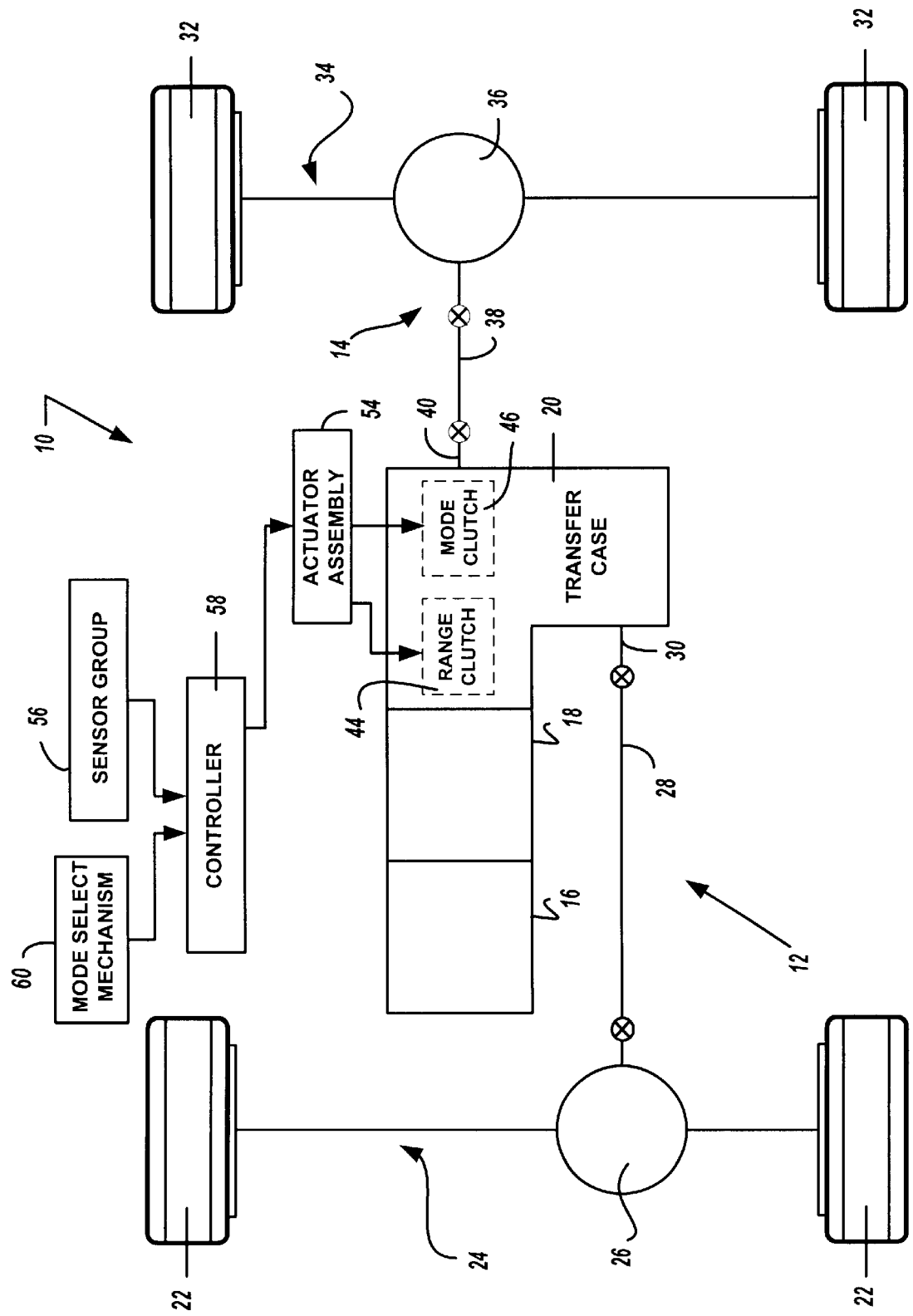
FIG. 1 is a schematic representation of a four-wheel drive motor vehicle equipped with a full-time power transfer system according to the present invention.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both driveable from a source of power, such as an engine 16, through a transmission 18 which may be of the manual or automatic type. In the particular embodiment shown, the drivetrain includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be detailed hereinafter with greater specificity, transfer case 20 is equipped with a planetary gear assembly 42, a range clutch assembly 44, and a mode clutch assembly 46. Planetary gear assembly 42 includes a first planetary gearset 48 and a second planetary gearset 50 interconnected through a common carrier assembly 52. Range clutch assembly 44 is operable to couple components of first planetary gearset 48 for driving carrier assembly 52 at either of a first (high-range) speed ratios or a second (low-range) speed ratio. Second planetary gearset 50 of planetary gear assembly 42 functions as an interaxle differential having carrier assembly 52 as its input with other components thereof operably coupled to front output shaft 30 and rear output shaft 40 of transfer case 20. Additionally, mode clutch assembly 46 is operable to control the magnitude of speed differentiation and torque biasing between rear output shaft 40 and rear output shaft 30. Power transfer system 10 further includes a power-operated actuator assembly 54 for controlling actuation of range clutch assembly 44 and mode clutch assembly 46, a sensor group 56 for sensing dynamic and operational characteristics of the motor vehicle and generating sensor input signals indicative thereof, and a controller 58 for generating control signals in response to the sensor input signals. Power transfer system 10 also includes a mode select mechanism 60 for permitting the vehicle operator to select one of the available drive modes. In particular, controller 58 functions to control actuation of power-operated actuator assembly 54 in response to the mode signal sent to controller 58 from mode select mechanism 60 that is indicative to the particular mode selected.

Figure 2:
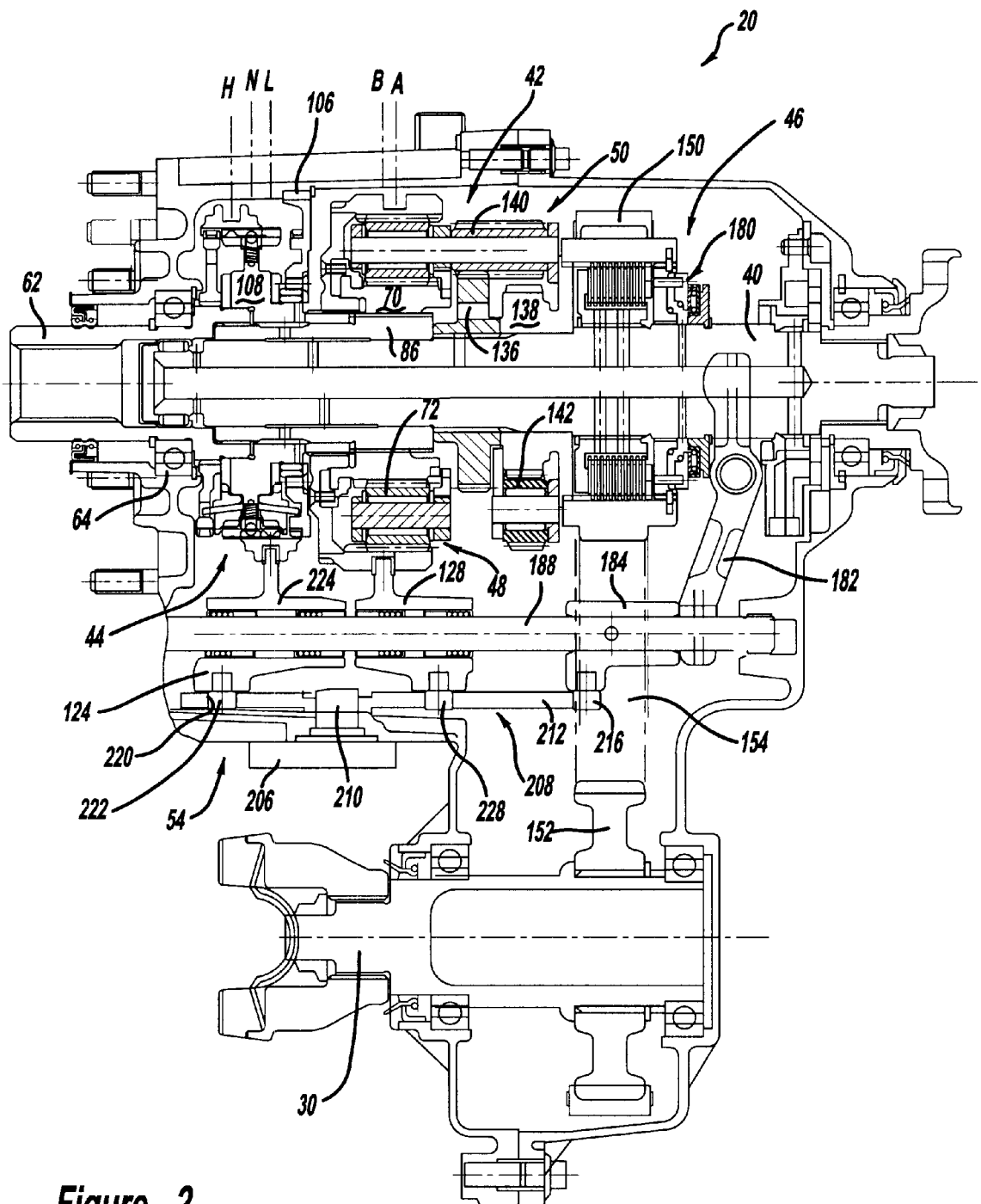
FIG. 2 is a sectional view of a full-time two-speed transfer case constructed according to a preferred embodiment of the present invention.
Figure 3:
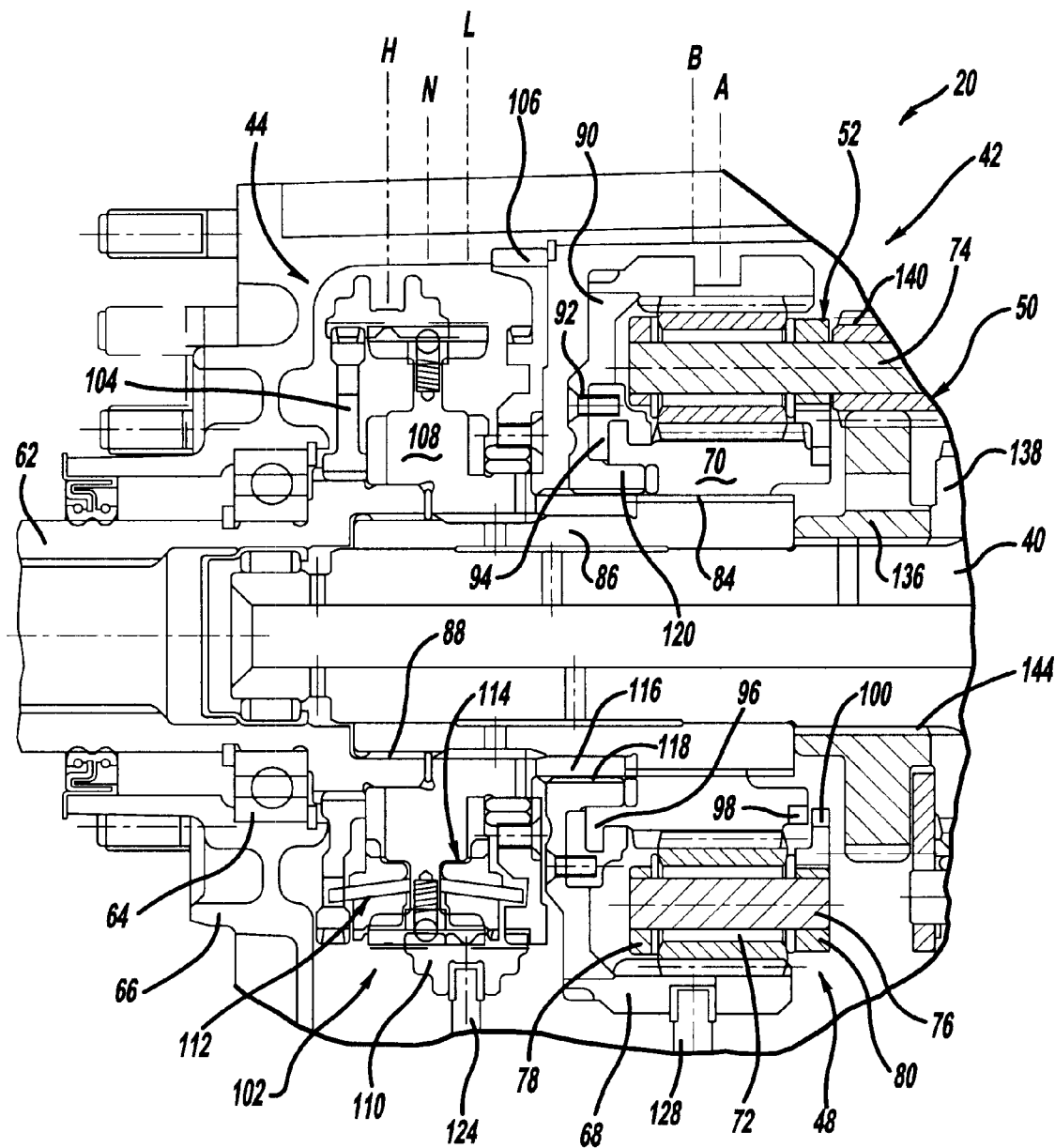
FIG. 3 is an enlarged partial view taken from FIG. 2 showing components of the synchronized range shift mechanism in greater detail.
Figure 4:
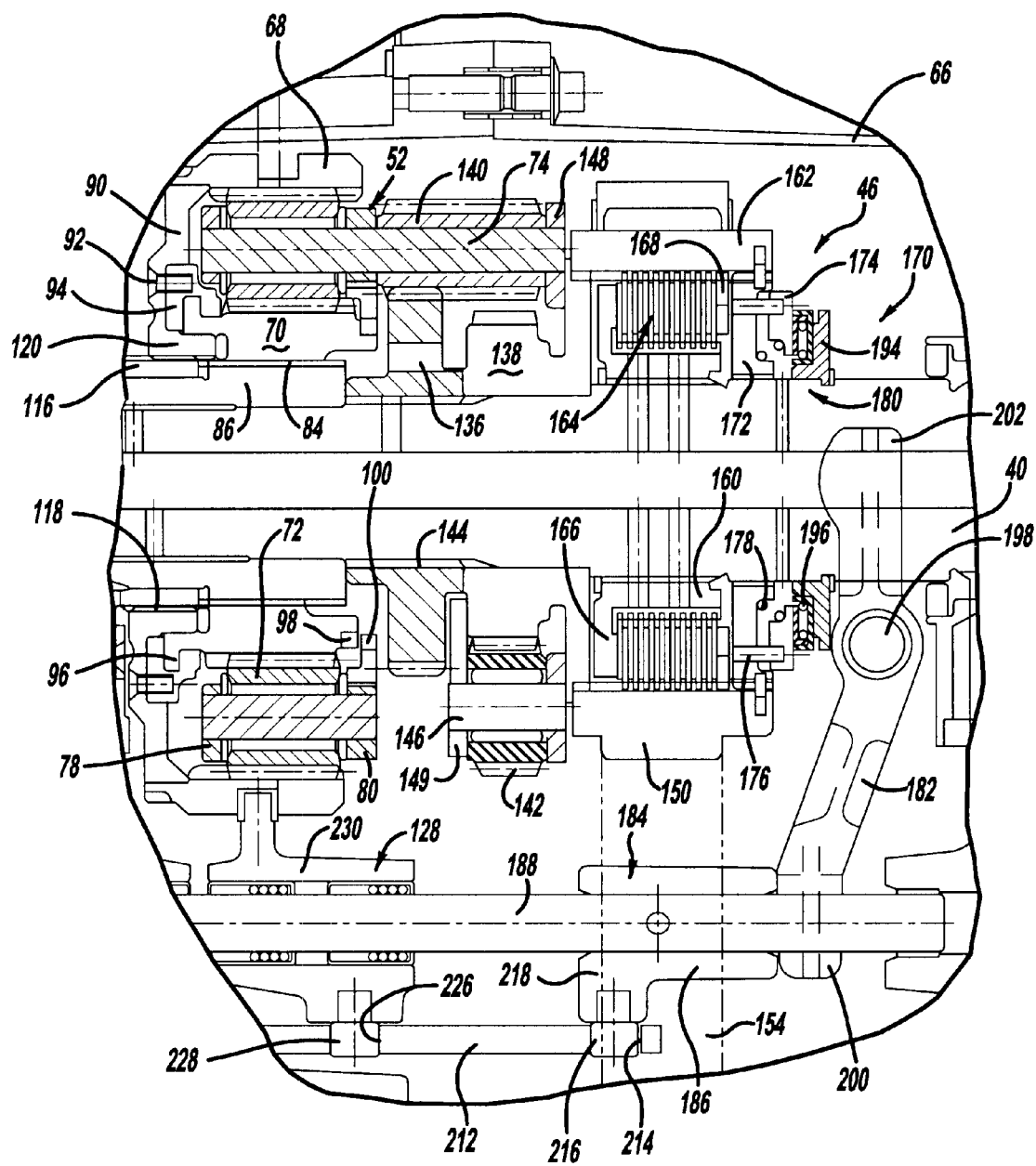
FIG. 4 is an enlarged partial view taken from FIG. 2 showing the components of the integrated planetary gear assembly in greater detail.

With particular reference now to FIG. 2 through 4 of the drawings, transfer case 20 is shown to include an input shaft 62 rotatably supported by a bearing assembly 64 from a housing 66. Input shaft 62 is adapted for connection to an output shaft of transmission 18. Likewise, front output shaft 30 and rear output shaft 40 are also rotatably supported by housing 66. As noted, planetary gear assembly 42 includes a first gearset 48 interconnected to second gearset 50 via a common carrier assembly 52. First gearset 48 includes a ring gear 68, a first sun gear 70, and a set of first planet gears 72 each meshed with ring gear 68 and first sun gear 70. Planet gears 72 are rotatably supported on long pins 74 and short pins 76, each of which extends between first and second carrier rings 78 and 80, respectively, of carrier assembly 52. First sun gear 70 is shown fixed via a splined connection 84 for rotation with and axial sliding movement on a quill shaft 86 journalled on rear output shaft 40 and which is fixed via a splined connection 88 for rotation with input shaft 62. As such, first sun gear 70 is always driven by input shaft 62.

Ring gear 68 is shown to include a radial plate segment 90 that is fixed via bolts 92 to a coupling ring 94. Coupling ring 94 includes a circumferential groove within which a radial lug segment 96 of first sun gear 70 is retained. Coupling ring 94 permits first sun gear 70 to rotate freely relative to ring gear 68 while also enabling concurrent axial movement of ring gear 68 and sun gear 70 relative to carrier assembly 52 between a first position (denoted by position line "A") and a second position (denoted by position line "B"). When ring gear 68 and first sun gear 70 are located in the A position, external clutch teeth 98 on first sun gear 70 are engaged with internal clutch teeth 100 on second carrier ring 80. As such, first sun gear 70 couples carrier assembly 52 for common rotation with input shaft 62. In contrast, sun gear clutch teeth 98 are released from engagement with clutch teeth 100 on second carrier ring 80 when ring gear 68 and first sun gear 70 are located in the B position, thereby allowing carrier assembly 52 to rotate relative to input shaft 62.

Range clutch assembly 44 is shown to include a range shift mechanism 102 having a first clutch plate 104 fixed (i.e., splined) to input shaft 62, a second clutch plate 106 fixed to housing 66, a clutch hub 108 journalled on portions of input shaft 62 and quill shaft 86, and a dog-type range sleeve 110 that is splined to clutch hub 108 for rotation therewith and axial movement thereon between three distinct range positions. A non-synchronized version of range shift mechanism 102 is shown in the upper-half of FIG. 2. Preferably, however, range shift mechanism 102 is synchronized to permit "on-the-move" shifting. Thus, a synchronized version of range shift mechanism 102 is shown in the lower-half of FIG. 2. The synchronized version of range shift mechanism 102 includes a first synchronizer 112 disposed between clutch hub 108 and first clutch plate 104 and a second synchronizer 114 disposed between clutch hub 108 and second clutch plate 106. Clutch hub 108 is shown to include an axially extending shaft segment 116 that is journalled on quill shaft 86. Ring gear 68 is coupled to clutch hub 108 via a splined connection 118 provided between shaft segment 116 of clutch hub 108 and an axially-extending hub 120 formed on plate segment 90 of ring gear 68. Splined connection 118 permits axial movement of ring gear 68 between it's A and B positions while maintaining a mechanical coupling with clutch hub 108.

As noted, range sleeve 110 is moveable between three distinct range positions shown to include a high-range ("H") position, a low-range ("L") position, and a neutral ("N") position. To this end, a first range fork 124 is provided which moves under the control of actuator assembly 54 to control axial movement of range sleeve 110 between its three range positions. First range fork 124 has a fork segment retained in a groove formed in range sleeve 110. Likewise, a second range fork 128 is provided which also moves under the control of actuator assembly 54 to control axial movement of ring gear 68 and first sun gear 70 between the two distinct positions. As seen, second range fork 128 has a fork segment retained in a groove formed in the outer periphery of ring gear 68. As will be detailed, actuator assembly 54 includes a drive mechanism which functions to coordinate movement of range forks 124 and 128 so as to coordinate axial movement of range sleeve 110 and ring gear 68 to establish different drive connections between input shaft 62 and carrier assembly 52.

A first or high-range drive connection is established between input shaft 62 and carrier assembly 52 when range sleeve 110 is in its H position and ring gear 64 is in its A position, as shown in the upper half of FIG. 2. With range sleeve 110 in its H position, its internal clutch teeth and engaged with external clutch teeth on first clutch plate 104 such that clutch hub 108 and ring gear 68 are coupled for common rotation with input shaft 62. Concurrently, positioning of ring gear 68 and first sun gear 70 in the A position causes external clutch teeth 98 on first sun gear 70 to engage internal clutch teeth 100 on second carrier ring 80. Thus, ring gear 68, first sun gear 70 and carrier assembly 52 are all commonly driven by input shaft 62. This establishes a direct speed ratio drive connection between input shaft 62 and carrier assembly 52 such that first planet gears 72 are unloaded during operation of transfer case 20 in the high-range modes. This is a-significant advantage over conventional two-speed planetary units since it eliminates concerns about fretting corrosion of the teeth on first planet gears 72 and permits use of quieter and smaller helical gears instead of conventional spur gears.

A second or low-range drive connection is established between input shaft 62 and carrier assembly 52 when range sleeve 110 is in its L position and ring gear 68 is in its B position, as shown in the lower-half of FIG. 2. With range sleeve 110 in its L position, its internal clutch teeth are engaged with external clutch teeth formed on second clutch plate 106 such that clutch hub 108 and ring gear 68 are braked against housing 66 to prevent rotation. In addition, movement of ring gear 68 and first sun gear 70 to the B position causes first sun gear 70 to slide axially to a position whereat its clutch teeth 98 are disengaged from clutch teeth 100 on second carrier ring 80. As such, driven rotation of input shaft 62 drives first sun gear 70 via quill shaft 86 such that carrier assembly 52 is rotatively driven at a reduced speed due to ring gear 68 being braked. Finally, a neutral (non-driven) mode is established when range sleeve 110 is in its N position and ring gear 68 is in its A position. With range sleeve 110 in its N position, its internal clutch teeth are disengaged from the external clutch teeth on first and second clutch plates 104 and 106. In this mode, no drive torque is delivered from input shaft 62 to carrier assembly 52.

With continued reference to FIG. 2 through 4, second gearset 50 is shown as a dual-planetary arrangement which functions as an interaxle differential to permit speed differentiation and distribute drive torque between front output shaft 30 and rear output shaft 40. Carrier assembly 52, when driven at either of the high-range and low-range speed ratios, acts as the input to second gearset 50 which has its outputs coupled to output shafts 30 and 40. In particular, second gearset 50 includes a second sun gear 136, a third sun gear 138, a set of full-length second planet gears 140, and a set of half-length third planet gears 142. Second sun gear 136 is shown to be fixed via a splined connection 144 to rear output shaft 40 while third sun gear 138 is journally supported thereon. Second planet gears 140 are rotatably supported on long pins 74 while third planet gears 142 are rotatably supported on short pins 146. Long pins 74 are shown to extend between second carrier ring 80 and a third carrier ring 148 while short pins 146 are shown to extend between third carrier ring 148 and a fourth carrier ring 149. Second planet gears 140 are meshed with second sun gear 136 while third planet gears 142 are meshed with third sun gear 138. In addition, second and third planet gears 140 and 142 are circumferentially arranged in meshed pairs. According to the particular construction shown, second sun gear 136 acts as a first output of second gearset 50 while third sun gear 138 acts as the second output thereof. Third sun gear 138 is fixed to a drive sprocket 150 that is operable for transferring drive torque to a driven sprocket 152 fixed to front output shaft 30. A power chain 154 is shown to interconnect driven sprocket 152 to drive sprocket 150.

As best seen from FIG. 4, mode clutch assembly 46 is arranged to control speed differentiation and torque biasing between front output shaft 30 and rear output shaft 40. Mode clutch assembly 46 is a multi-plate friction clutch which includes a clutch hub 160 that is fixed to rear output shaft 40, a clutch drum 162 integrally formed with drive sprocket 150, and a clutch pack 164 disposed therebetween. Clutch pack 164 includes a set of inner friction plates splined to clutch hub 160 and which are interleaved with a set of outer friction plates splined to drum 162. Clutch pack 164 is located between a reaction plate 166 formed integrally with clutch hub 160 and an apply plate 168 that is splined to drum 162. As will be detailed, movement of apply plate 168 relative to clutch pack 164 functions to vary the compressive engagement force exerted thereon for adaptively regulating speed differentiation and torque biasing between front output shaft 30 and rear output shaft 40.

Mode clutch assembly 46 further includes a clutch actuation mechanism 170 for moving apply plate 168 under the control of actuation assembly 54. Mechanism 170 includes a locator plate 172 that is splined for rotation with clutch drum 162, a pressure plate 174, and a set of thrust pins 176 having one end fixed to pressure plate 174 and which extend through apertures in locator plate 172. The second end of thrust pins 176 are adapted to engage apply plate 168. A return spring 178 urges pressure plate 174 in a direction away from locator plate 172 for normally retracting thrust pins 176 from engagement with apply plate 168. However, axial movement of pressure plate 174 between a fully-retracted position and a fully-extended position causes thrust pins 176 to exert a clutch engagement force on apply plate 168 that varies between predetermined minimum and maximum values.

To provide means for moving pressure plate 174 between its fully retracted and fully extended positions, clutch actuation mechanism 170 includes a thrust assembly 180, a lever arm 182, and a mode fork 184. Mode fork 184 has a tubular segment 186 fixed to a shift rail 188, the opposite ends of which are supported in sockets formed in housing 66. Thrust assembly 180 includes a thrust ring 194 and a thrust bearing assembly 196 that is disposed between thrust ring 194 and pressure plate 174. In addition, lever arm 182 is mounted to a pivot post 198 for pivotal movement relative to thrust assembly 180. Lever arm 182 includes a first end portion 200 that is journalled on shift rail 188 and which engages one end of mode fork 184. The opposite end portion 202 of lever arm 182 is a C-shaped biforcated section partially surrounding rear output shaft 40 and which engages thrust ring 194. In operation, axial movement of mode fork 184 causes corresponding pivotal movement of lever arm 182 which, in turn, controls movement of thrust assembly 180 and pressure plate 174.

Preferably, actuator assembly 54 includes a rotary actuator, such as an electric gearmotor 206, which is operable for generating an output torque, the value of which varies as a function of the magnitude of the electrical control signal applied thereto by controller 60. To provide means for selectively controlling the magnitude of the clutch engagement force exerted on clutch pack 164 and coordinate movement of range forks 124 and 128, actuator assembly 54 further includes a drive mechanism 208. Drive mechanism 208 is interconnected to a rotary output member 210 of gearmotor 206 for changing its output torque into an axially-directed forces that are used for controlling axial movement of range forks 124, 128 and mode fork 184. According to a preferred construction, drive mechanism 208 includes a sector plate 212 that is rotatably driven through a range of angular motion by output member 210 of gearmotor 206.

To generate axial movement of mode fork 184, sector plate 212 includes a mode slot 214 within which a mode pin 216 is retained. Mode pin 216 is fixed to a flange section 218 of mode fork 184. The contour of mode slot 214 is configured to cause the desired direction and amount of axial movement of mode fork 184 in response to rotation of sector plate 212 for generating the desired clutch engagement force exerted by actuation mechanism 170 on clutch pack 164. To control axial movement of range sleeve 110, sector plate 212 also has a first range slot 220 within which a first range pin 222 extends. First range pin 222 is fixed to a tubular segment 224 of first range fork 124 which is shown supported for sliding movement on shift rail 188. The contour of first range slot 220 is configured to cause controlled axial movement of range sleeve 110 in response to controlled rotation of sector plate 212. In a similar fashion, sector plate 212 includes a second range slot 226 within which a second range pin 228 extends. Second range pin 228 is fixed to a tubular segment 230 of second range fork 128 which is likewise supported for sliding movement on shift rail 188. Again, the contour of second range slot 226 is configured to cause control axial movement of ring gear 68 and first sun gear 70 in response to controlled rotation of sector plate 212.

According to a preferred embodiment of the present invention, sector plate 212 may be rotated to any one of five distinct sector positions to establish a corresponding number of drive modes. These modes may include a locked four-wheel high-range drive mode, a full-time four-wheel high-range drive mode, a neutral mode, a full-time four-wheel low-range drive mode, and a locked four-wheel low-range drive mode. The particular four-wheel drive mode selected is established by the position of mode pin 216 in mode slot 214, the position of first range pin 222 in first range slot 220, and the position of second range pin 228 and second range slot 226. In operation, the vehicle operator selects a desired four-wheel drive mode via actuation of mode select mechanism 60 which, in turn, sends a mode signal to controller 58 that is indicative of the selection. Thereafter, controller 58 generates an electric control signal that is applied to gearmotor 206 for controlling the rotated position of sector plate 212. More particularly, upon selection of the locked four-wheel high-range drive mode, the neutral mode, or the locked four-wheel low-range drive mode, sector plate 212 is controllably rotated to a predefined sector position associated with each mode. However, when either of the full-time four-wheel high-range or low-range drive modes are selected, power transfer system 10 is operable for modulating the clutch engagement force applied to clutch pack 164 of mode clutch assembly 46 as a function of the various sensor input signals.

Mode select mechanism 60 can take the form of any mode selector device which is under the control of the vehicle operator for generating a mode signal indicative of the specific mode selected. In one form, the mode selector device may be in an array of dash-mounted push button switches. Alternatively, the mode selector may be a manually-operable shift lever sequentially moveable between a plurality of positions corresponding to the available operational modes which, in conjunction with a suitable electrical switch arrangement, generates a mode signal indicating the selected mode. In either form, mode select mechanism 60 offers the vehicle operator the option of deliberately choosing between the various operative drive modes.

When the locked full-time four-wheel high-range drive mode is selected, sector plate 212 is rotated to a sector position causing range sleeve 110 to move to its H position, ring gear 68 to move to it's A position, and mode fork 184 to move to a position whereat pressure plate 174 is in its fully extended position. As such, the maximum clutch engagement force is exerted on clutch pack 164 and mode clutch assembly 46 is considered to be operating in a fully actuated (locked-up) condition. Thus, speed differentiation between rear output shaft 40 and front output shaft 30 is prevented. Power transfer system 10 may also include a brake which is an electrically controlled device. The brake is engaged once sector plate 212 is rotated to its sector position corresponding to the locked full-time four-wheel high-mode for locking sector plate 212 against further rotation.

If mode select mechanism 60 thereafter signals selection of the full-time four-wheel high-range drive mode, gearmotor 206 is actuated for initially rotating sector plate 212 to a position causing mode fork 184 to move to a position whereat pressure plate 174 is in its fully retracted position while range sleeve 110 is maintained in its H position and ring gear 68 is maintained it its A position. As such, the minimum clutch engagement force is exerted on clutch pack 164 such that mode clutch assembly 46 is considered to be in a mon-actuated condition, thereby permitting unrestricted speed differentiation between the output shafts. However, in the full-time four-wheel high-range drive mode, mode clutch assembly 46 provides adaptive control of speed differentiation and torque biasing. Specifically, the actuated state of gearmotor 206 is continuously monitored and modulated in accordance with specific predefined relationships based on the current value of the sensor input signals. As is apparent, the magnitude of the clutch engagement force is varied by bi-directional rotation of sector plate 212 between its full-time and locked high-range sector positions.

Power transfer system 10 also permits transfer case 20 to be shifted into the neutral mode upon mode selection mechanism 60 signaling selection thereof. Controller 58 commands gearmotor 206 to rotate sector plate to a neutral sector position. In this sector position, the contour of first range slot 220 has caused range sleeve 110 to move to its N position while the contour of second range slot 226 has caused ring gear 68 to move to, or remain in, it's A position. Likewise, mode slot 214 has caused mode fork 184 to move to a position whereat mode clutch assembly 46 is non-actuated.

If a full-time four-wheel low-range drive mode is made available, its selection would cause gearmotor 206 to rotate sector plate 212 to a corresponding sector position whereat range sleeve 110 is in its L position, ring gear 68 is in its B position, and mode clutch assembly is non-actuated. Again, the contour of the range and mode slots control the coordinated movement of range forks 124, 128 and mode fork 184 to establish the desired mode. Preferably, automatic clutch control in the full-time low-range drive mode is similar to that described the full-time four-wheel high-range drive mode. To accomplish this adaptive clutch control, sector plate 212 must be moveable from its full-time low-range sector position to a locked four-wheel low-range drive mode sector position where a maximum engagement force is applied to clutch pack 164. As before, such rotation of sector plate 212 occurs while range sleeve 110 is maintained in its L position and ring gear 68 is maintained in its B position. Automatic control of mode clutch assembly 46 is then accomplished in the full-time four-wheel low-range drive mode to bias torque and limit slip automatically. Finally, selection of the locked four-wheel low-range drive mode signals controller 58 to rotate sector plate 212 to its corresponding sector position. In this sector position, range sleeve 110 is in its L position, ring gear 68 is in its B position, and mode fork 184 is in the position where pressure plate 174 is in its fully extended position such that mode clutch assembly 46 is locked-up. As before, the brake can be applied to hold sector plate 212 in this position so as to allow gearmotor 206 to be turned-off, thereby decreasing its on-time service.

Figure 5:
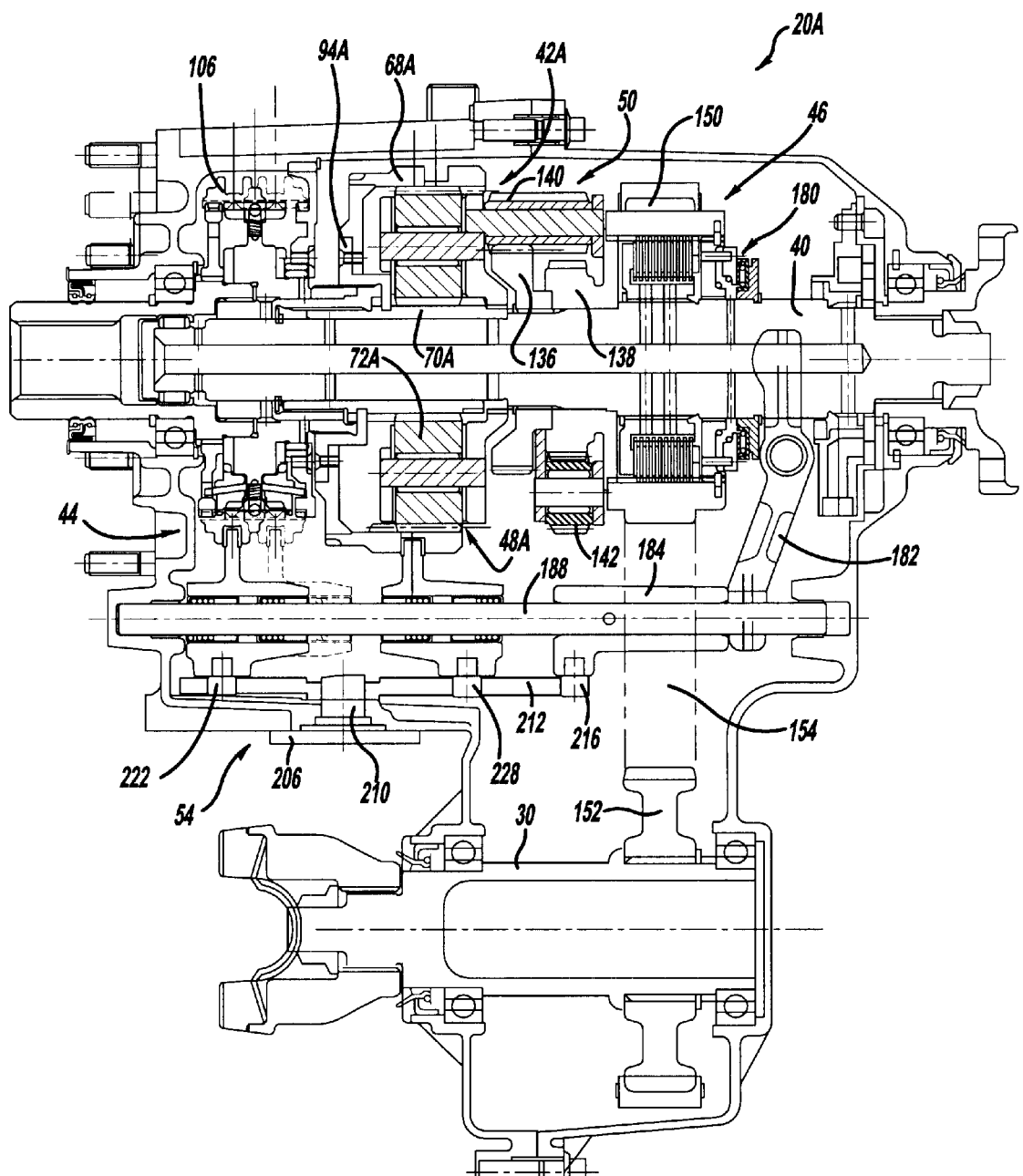
FIG. 5 is a sectional view of a full-time two-speed transfer case constructed according to an alternative preferred embodiment of the present invention.
Figure 6:
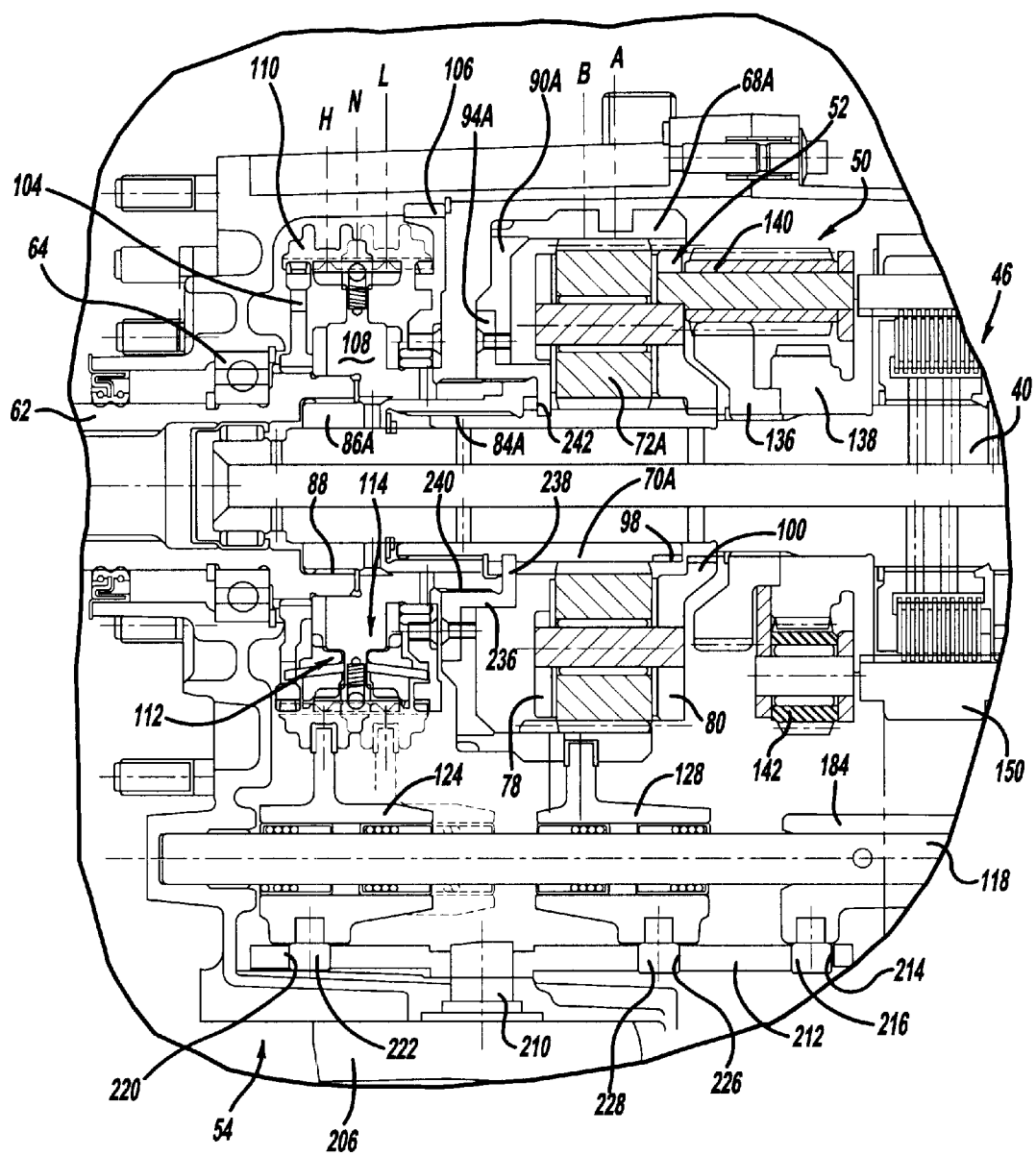
FIG. 6 is an enlarged partial view of FIG. 5 showing the synchronized range shift mechanism and integrated planetary gear assembly in greater detail.

Referring now to FIGS. 5 and 6, a modified version of transfer case 20 is designated by reference numeral 20A and the same numbers are used to identify common components. Basically, transfer case 20A is substantially similar in structure and function to that of transfer case 20 except that first planetary gearset 48 was arranged to provide a ratio of about 2.6 to 1 for its low-range while first planetary gearset 48A of transfer case 20A is adapted to provide a ratio of about 3.9 to 1 for its low-range. Specifically, in first planetary gearset 48, first sun gear 70 has 55 teeth while ring gear 68 has 89 teeth and first planet gears 72 each have 17 teeth to define the 2.6:1 ratio. In contrast, first planetary gearset 48A has a first sun gear 70A with 31 teeth while ring gear 68A has 89 teeth and first planet gears 72A each have 29 teeth. To accommodate the different size requirements for first sun gear 70A and first planet gears 72A, transfer case 20A includes a modified coupling ring 94A which is still functional to couple sun gear 70A for axial movement with ring gear 68A while permitting relative rotation therebetween.

First sun gear 70A is shown to be fixed via a splined connection 84A for axial movement relative to quill shaft 86A. Coupling ring 94A is fixed to plate segment 90A of ring gear 68A and includes a tubular segment 236 and a radial ring segment 238. Tubular segment 236 of coupling ring 94A is fixed via a splined connection 240 to clutch hub 108 such that ring gear 68A is coupled for rotation with clutch hub 108 while axially moveable relative thereto. Ring segment 238 of coupling ring 94A is shown retained in a circumferential groove 242 formed in first sun gear 70A. Thus, sun gear 70A is again coupled for axial movement with ring gear 68A between the A and B positions while still capable of rotation relative to ring gear 68A. As with transfer case 20, actuator assembly 54 is again provided for controlling coordinated movement of range sleeve 110 between its three distinct positions and movement of ring gear 68A between its two distinct positions to establish the high-range and low-range drive connections between input shaft 62 and carrier assembly 52.

Figure 7:
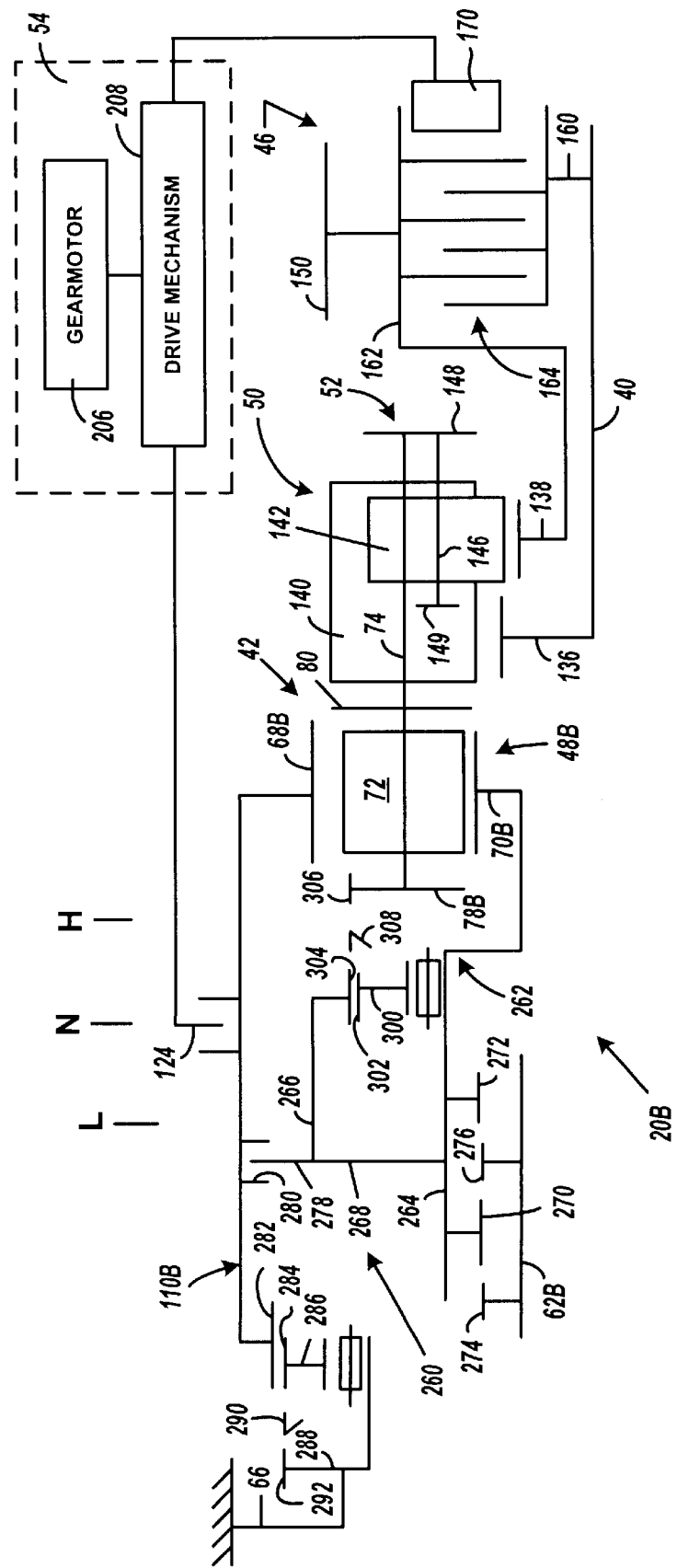
FIG. 7 is a partial sectional view showing another alternative preferred embodiment of a synchronized range shift mechanism and integrated, planetary gear assembly for use in a full-time two-speed transfer, case of the present invention.

Referring now to FIG. 7, a transfer case 20B is schematically shown to be a modified version of transfer case 20 such that common reference numerals are again used to identify similar components. Basically, transfer case 20B has a modified synchronized range shift mechanism 260 that combines movement of range sleeve 110 and ring gear 68 of transfer case 20 so as to provide reduced complexity and minimized packaging requirements. Specifically, planetary gear assembly 42 includes a first gearset 48B interconnected to second gearset 50 via carrier assembly 52. First gearset 48B includes a first sun gear 70B, a ring gear 68B and first planet gears 72 rotatably supported between carrier rings 78B and 80. Sun gear 70B is shown to have a coupling ring 262 fixed thereto which includes an inner cylindrical rim segment 264 and an outer cylindrical rim segment 266 interconnected by a plate segment 268. Inner rim segment 264 has a set of first internal spline teeth 270 which are axially offset from from a set of second internal spline teeth 272. Also, input shaft 62B is shown to include a first set of external spline teeth 274 and a second set of external spline teeth 276. A radial lug 278 extending outwardly from outer ring segment 266 is retained in a circumferential groove 280 formed in range sleeve 110B. Ring gear 68B is shown to be fixed to one end of range sleeve 110B such that it and sun gear 70B are axially moveable with range sleeve 110B.

Range sleeve 110B is axially moveable between three distinct range positions (L, N, H) via movement of range fork 124 upon controlled actuation of actuator assembly 54. Range sleeve 110B includes internal clutch teeth 282 which are in constant mesh with external teeth 284 formed on a low hub 286. Low hub 286 is rotatably supported on a low clutch plate 288 that is fixed to housing 66. A low synchronizer assembly 290 is dosposed between low hub 286 and low clutch plate 288 and functions to establish speed synchronization therebetween prior to permitting clutch teeth 282 of range sleeve 110B to enter into engagement with clutch teeth 292 on low clutch palte 288 during movement of range sleeve 110B into its L position. When a four-wheel low-range drive mode is selected, gearmotor 206 rotates sector plate 212 of drive mechanism 208 for causing range fork 124 to move range sleeve 110B to its L position Such movement of range sleeve 110B causes both sets of clutch teeth 270 and 272 on coupling ring 262 to meshingly engage corresponding sets of clutch teeth 274 and 276 on input shaft 62B while also causes its clutch teeth 282 to engage clutch teeth 292 on low clutch plate 288. Thus, sun gear 70B is driven by input shaft 62B and ring gear 68B is braked by housing 66 against rotation such that carrier assembly 52 is driven at a reduced speed ratio. First planetary gearset 48B can be arranged to provide any suitable reduction ratio including, without limitation, either of the 2.6:1 or 3.9:1 ratio previously disclosed.

With continued reference to FIG. 7, synchronized range shift mechanism 260 is further shown to include a high clutch hub 300 that is rotatably supported on coupling ring 262 and which has external spline teeth 302 in constant mesh with internal clutch teeth 304 formed in outer ring segment 266 of coupling ring 262. First carrier ring 78B is shown to include clutch teeth 306 that are aligned to receive clutch teeth 304 of coupling ring 262 upon movement of range sleeve 110B to its H position. A high synchronizer assembly 308 is disposed between hub 300 and carrier ring 78B and functions to establish speed synchronization between carrier assembly 52 and sun gear 70B prior to engagement of coupling ring teeth 304 with carrier ring teeth 306. When it is desired to establish a four-wheel high-range drive mode, range sleeve 110B is moved to its H position where teeth 270 on coupling ring 262 engage teeth 276 on input shaft 62B such that sun gear 70B is driven by input shaft 62B. Also, upon synchronization, clutch teeth 304 on coupling ring 262 engages clutch teeth 306 on first carrier ring 78B such that a direct drive connection between input shaft 62B and carrier assembly 52 is established. Range sleeve 110B is shown in its N position with coupling ring 262 disengaged from input shaft 62B.

The foregoing discussion discloses and describes the preferred embodiments for the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case comprising:
   an input shaft;
   first and second output shafts;
   a planetary gear assembly interconnecting said input shaft to said first and second output shafts and including first and second gearsets having a common carrier assembly, said first gearset including a first sun gear driven by said input shaft, a ring gear, and a first planet gear supported by said carrier assembly and meshed with said first sun gear and said ring gear, said second gearset including a second sun gear connected to said first output shaft, a third sun gear operably connected to said second output shaft, a second planet gear supported by said carrier assembly and meshed with said second sun gear, and a third planet gear supported by said carrier assembly and meshed with said third sun gear and said second planet gear;
   a coupling ring interconnecting said ring gear to said first sun gear to permit concurrent movement thereof between a first position and a second position while allowing relative rotation therebetween, said first sun gear rotates relative to said carrier assembly when located in said second position and is coupled to said carrier assembly when located in said first position;
   a range clutch including a first clutch plate fixed to said input shaft, a second clutch plate fixed to a stationary member, a clutch hub fixed for rotation with said ring gear, and a range sleeve supported for rotation with said clutch hub and movement thereon between a high-range position and low-range position, said range sleeve operable in its high-range position to couple said clutch hub to said first clutch plate such that said ring gear is driven by said input shaft and is further operable in its low-range position to couple said clutch hub to said second clutch plate such that said ting gear is couple to said stationary member; and
   a shift mechanism for moving said ring gear and said range sleeve to establish high-range and low-range drive connections between said input shaft and said carrier assembly, said high-range drive connection is established when said range sleeve is in its high-range position and said ring gear is in its first position and said low-range drive connection is established when said range sleeve is in its low-range position and said ring gear is in its second position.

2. The transfer case of claim 1 wherein said range clutch further includes a first synchronizer operably disposed between said first clutch plate and said clutch hub for inhibiting movement of said range sleeve to its high-range position until speed synchronization is established therebetween, and a second synchronizer operably disposed between said second clutch plate and said clutch hub for inhibiting movement of said range sleeve to its low-range position until speed synchronization is established therebetween.

3. The transfer case of claim 1 further comprising a quill shaft having a first end splined to said input shaft and a second end splined to said first sun gear, said first sun gear adapted to slide axially relative to said quill shaft between its first and second positions while being continuously driven by said input shaft.

4. The transfer case of claim 3 wherein said clutch hub is rotatably supported on said quill shaft and has a spline connection with one of said ring gear and said coupling ring to enable sliding movement of thereof relative to said clutch hub.

5. The transfer case of claim 4 wherein said ring gear includes a plate segment, and wherein said coupling ring is fixed to said plate segment of said ring gear and has a circumferential groove within which a radial lug segment of said first sun gear is retained.

6. The transfer case of claim 4 wherein said coupling ring is fixed to said ring gear and has internal splines formed thereon which engage external splines on said clutch hub, said coupling ring further including a radial lug which is retained in a circumferential groove formed in said first sun gear.

7. The transfer case of claim 1 wherein said shift mechanism includes a first range fork operable for moving said range sleeve between its high-range and low-range positions, a second range fork operable for moving said ring gear between its first and second positions, and an actuator assembly for moving said first and second range forks.

8. The transfer case of claim 7 wherein said actuator assembly includes a sector plate and a power-operated actuator for rotating said sector plate, and wherein said first and second range forks engage said sector plate such that rotation of said sector plate causes movement of said first and second range forks.

9. The transfer case of claim 1 further including a mode clutch operably disposed between said first and second output shafts and which is normally operable to permit speed differentiation between said output shafts, said mode clutch is further operable for limiting excessive speed differentiation between said output shafts.

10. The transfer case of claim 9 wherein said mode clutch is a multi-plate clutch assembly having a set of first clutch plates fixed for rotation with said first output shaft and which are interleaved with a set of second clutch plates fixed for rotation with said second output shaft, and means for transferring drive torque from the faster rotating clutch plates to the slower rotating clutch plates in response to said speed differential exceeding a predefined value.

11. The transfer case of claim 10 wherein said mode clutch includes a thrust mechanism for exerting a clutch engagement force on said interleaved clutch plates, and an actuator assembly for generating said clutch engagement force.

12. A transfer case comprising:

an input shaft;

first and second output shafts;

a planetary gear assembly interconnecting said input shaft to said first and second output shafts and including first and second gearsets having a common carrier assembly, said first gearset including a first sun gear continuously driven by said input shaft, a ring gear, and a first planet gear supported by said carrier assembly and meshed with said first sun gear and said ring gear, said second gearset including a second sun gear connected to said first output shaft, a third sun gear operably connected to said second output shaft, a second planet gear supported by said carrier assembly and meshed with said second sun gear, and a third planet gear supported by said carrier assembly and meshed with said third sun gear and said second planet gear, said ring gear interconnected to said first sun gear to permit concurrent sliding movement thereof between a first position and a second position while allowing relative rotation therebetween, said first sun gear is permitted to rotate relative to said carrier assembly when located in its second position and said first sun gear is coupled to said carrier assembly when located in its first position;

a range clutch including a first clutch plate fixed to said input shaft, a second clutch plate fixed to a stationary member, a clutch hub fixed for rotation with said ring gear, and a range sleeve splined to said clutch hub and sliding movement thereon between a high-range position and a low-range position, said range sleeve operable in its high-range position to couple said clutch hub to said first clutch plate such that said ring gear is driven by said input shaft and is further operable in its low-range position to couple said clutch hub to said second clutch plate such that said ring gear is braked; and a shift mechanism for moving of said ring gear and said range sleeve to establish high-range and low-range drive connections between said input shaft and said carrier assembly, said high-range drive connection is established when said range sleeve is in its high-range position and said ring gear is in its first position and said low-range drive connection is established when said range sleeve is in its low-range position and said ring gear is in its second position.

13. The transfer case of claim 12 wherein said range clutch further includes a first synchronizer operably disposed between said first clutch plate and said clutch hub for inhibiting movement of said range sleeve to said high-range position until speed synchronization is established therebetween, and a second synchronizer operably disposed between said second clutch plate and said clutch hub for inhibiting movement of said range sleeve to its low-range position until speed synchronization is established therebetween.

14. The transfer case of claim 12 further comprising a quill shaft having a first end splined to said input shaft and a second end splined to said first sun gear, said first sun gear adapted to slide axially relative to said quill shaft between its first and second positions while being continuously driven by said input shaft.

15. The transfer case of claim 12 wherein said shift mechanism includes a first range fork operable for moving said range sleeve between its high-range and low-range positions, a second range fork operable for moving said ring gear between its first and second positions, and an actuator assembly for moving said first and second range forks.

16. The transfer case of claim 15 wherein said actuator assembly includes a sector plate and a power-operated mover for rotating said sector plate, and wherein said first and second range forks are connected to said sector plate.

\* \* \* \* \*